(12) United States Patent
Ko

(10) Patent No.: US 10,449,937 B2
(45) Date of Patent: Oct. 22, 2019

(54) ELECTRONIC BRAKE SYSTEM AND CONTROL METHOD THEREOF

(71) Applicant: MANDO CORPORATION, Pyeongtaek-si, Gyeonggi-do (KR)

(72) Inventor: Yeon-Ben Ko, Hwaseong-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 18 days.

(21) Appl. No.: 15/795,507

(22) Filed: Oct. 27, 2017

(65) Prior Publication Data
US 2018/0118179 A1 May 3, 2018

(30) Foreign Application Priority Data
Oct. 27, 2016 (KR) .......................... 10-2016-0140697

(51) Int. Cl.
| | |
|---|---|
| *B60T 8/40* | (2006.01) |
| *B60T 7/04* | (2006.01) |
| *B60T 8/175* | (2006.01) |
| *B60T 8/1761* | (2006.01) |
| *B60T 13/14* | (2006.01) |
| *B60T 8/176* | (2006.01) |

(52) U.S. Cl.
CPC .............. *B60T 8/404* (2013.01); *B60T 7/042* (2013.01); *B60T 8/175* (2013.01); *B60T 8/176* (2013.01); *B60T 8/1761* (2013.01); *B60T 13/142* (2013.01); *B60T 2220/04* (2013.01)

(58) Field of Classification Search
CPC .......... B60T 8/404; B60T 7/042; B60T 8/175; B60T 8/176; B60T 8/1761; B60T 13/142; B60T 2220/04
See application file for complete search history.

(56) References Cited

U.S. PATENT DOCUMENTS

| | | | |
|---|---|---|---|
| 2015/0298664 A1* | 10/2015 | Nimura ..................... | B60T 8/36 701/70 |
| 2016/0185332 A1* | 6/2016 | Jeon ....................... | B60T 13/686 303/9.61 |
| 2017/0106343 A1* | 4/2017 | Eickhoff ............... | H01M 8/065 |

FOREIGN PATENT DOCUMENTS

EP          2 520 473 A1     11/2012

* cited by examiner

*Primary Examiner* — Melanie Torres Williams
(74) *Attorney, Agent, or Firm* — Hauptman Ham, LLP

(57) ABSTRACT

Disclosed herein is an electronic brake system, which includes at least one or more valves provided to control a hydraulic pressure delivered to wheel cylinders provided in wheels, a pressure measurer configured to measure the hydraulic pressure delivered to the wheel cylinders provided in the wheels, and a controller configured to open at least one or more valves that deliver the hydraulic pressure to a corresponding wheel cylinder and close at least one or more valves that deliver the hydraulic pressure to the remaining wheel cylinders other than the corresponding wheel cylinder when the at least one or more valves are detected as being opened or closed a predetermined number of times or more during a predetermined time period, and synchronize the measured hydraulic pressure with a hydraulic pressure of the wheel cylinder having all of the at least one or more valves open.

8 Claims, 6 Drawing Sheets

ELECTRONIC BRAKE SYSTEM AND CONTROL METHOD THEREOF

CROSS-REFERENCE TO RELATED APPLICATION

This application claims the benefit of Korean Patent Application No. 2016-0140697, filed on Oct. 27, 2016 in the Korean Intellectual Property Office, the disclosure of which is incorporated herein by reference.

BACKGROUND

1. Field

Embodiments of the present disclosure relate to an electronic brake system, and more particularly, to a control method for minimizing an error between an actual brake pressure and an estimated brake pressure of each wheel in an electronic brake system configured to generate a braking force using an electric signal corresponding to a displacement of a brake pedal.

2. Description of the Related Art

A vehicle is necessarily equipped with a brake system for braking the vehicle. Lately, several kinds of systems for obtaining a strong and stable braking force are being proposed.

Examples of brake systems include an anti-lock brake system (ABS) for preventing wheels from locking up while braking, a brake traction control system (BTCS) for preventing drive wheels from slipping upon a sudden unintended acceleration or a sudden acceleration of a vehicle, and an electronic stability control system (ESC) configured to stably maintain the travel of a vehicle by controlling brake hydraulic pressure in combination with the anti-lock brake system and traction control.

Generally, an electronic brake system includes a hydraulic pressure supply device configured to receive a driver's braking intent from a pedal displacement sensor configured to detect a displacement of a brake pedal in the form of an electric signal when the driver depresses the brake pedal, and supply a pressure to a wheel cylinder.

An electronic brake system provided with such a hydraulic pressure supply device is disclosed in European Patent No. EP 2 520 473. According to the disclosed document, the hydraulic pressure supply device is configured to generate a braking pressure through a motor that operates according to a pedal force of the brake pedal. In this case, the braking pressure is generated by converting a rotational force of the motor into a linear motion and pressing a piston.

Also, the electronic brake system includes a simulation device configured to provide a reaction force to the driver in response to a brake pedal force. In this case, the simulation device is connected to an oil reservoir, and a simulator valve is installed in an oil flow path to which the simulation device and the reservoir are connected.

In this case, when a brake hydraulic pressure is controlled by an ABS for preventing wheels from locking up while braking, a BTCS for preventing drive wheels from slipping upon a sudden unintended acceleration or a sudden acceleration of a vehicle, and a combination of the ABS and transaction control, the electronic brake system has a problem in that an error between an estimated braking pressure and an actual braking pressure of each wheel greatly increases due to an operation of repeatedly opening and closing a valve located between a wheel cylinder and the flow path.

SUMMARY

Therefore, it is an aspect of the present disclosure to provide a solution to a problem of increasing error between an estimated braking pressure and an actual braking pressure caused by repeatedly opening and closing valves located at wheels during a braking control of ABS, TCS, or the like.

Additional aspects of the disclosure will be set forth in part in the description which follows and, in part, will be obvious from the description, or may be learned by practice of the disclosure.

In accordance with one aspect of the present disclosure, an electronic brake system includes: at least one or more valves provided to control a hydraulic pressure delivered to wheel cylinders provided in wheels; a pressure measurer configured to measure the hydraulic pressure delivered to the wheel cylinders provided in the wheels; and a controller configured to open at least one or more valves that deliver the hydraulic pressure to a corresponding wheel cylinder and close at least one or more valves that deliver the hydraulic pressure to the remaining wheel cylinders other than the corresponding wheel cylinder when the at least one or more valves are detected as being opened or closed a predetermined number of times or more during a predetermined time period, and synchronize the measured hydraulic pressure with a hydraulic pressure of the wheel cylinder having all of the at least one or more valves open.

The electronic brake system may further include: a master cylinder configured to discharge oil in response to a pedal force applied to a brake pedal; a reservoir connected to the master cylinder and configured to store the oil; a pedal displacement sensor configured to detect a displacement of the brake pedal; a hydraulic pressure supply device configured to generate a hydraulic pressure by using a rotational force of a motor operated by an electric signal output from the pedal displacement sensor; and a hydraulic pressure control unit configured to deliver the hydraulic pressure discharged from the hydraulic pressure supply device to the wheel cylinders provided in the wheels, wherein the control unit may control the motor and the valves on the basis of hydraulic pressure information and displacement information of the brake pedal.

The control unit may restart to control the motor and the valves on the basis of the hydraulic pressure information and the displacement information of the brake pedal after synchronizing a pressure of the wheel cylinder.

The control unit may detect that the at least one or more valves are opened or closed a predetermined number of times or more during a predetermined time period during an anti-lock brake system (ABS) or traction control system (TCS) control.

In accordance with another aspect of the present disclosure, a control method of an electronic brake system includes: controlling a hydraulic pressure delivered to wheel cylinders provided in wheels by opening or closing at least one or more valves; measuring the hydraulic pressure delivered to the wheel cylinders provided in the wheels; determining whether the at least one or more valves are detected as being opened or closed a predetermined number of times or more during a predetermined time period; opening at least one or more valves that deliver the hydraulic pressure to a corresponding wheel cylinder and closing at least one or more valves that deliver the hydraulic pressure to the remaining wheel cylinders other than the corresponding wheel cylinder when the at least one or more valves are detected as being opened or closed a predetermined number of times or more during a predetermined time period; and synchronizing the measured hydraulic pressure with a hydraulic pressure of the wheel cylinder having all of the at least one or more valves open.

The electronic brake system may include a master cylinder configured to discharge oil in response to a pedal force applied to a brake pedal; a reservoir connected to the master cylinder and configured to store the oil; a pedal displacement sensor configured to detect a displacement of the brake pedal; a hydraulic pressure supply device configured to generate a hydraulic pressure by using a rotational force of a motor operated by an electric signal output from the pedal displacement sensor; and a hydraulic pressure control unit configured to deliver the hydraulic pressure discharged from the hydraulic pressure supply device to the wheel cylinders provided in the wheels.

The control method may further include restarting control of the motor and the valves on the basis of hydraulic pressure information and displacement information of the brake pedal after synchronizing a pressure of the wheel cylinder.

The determination of whether the at least one or more valves are detected as being opened or closed a predetermined number of times or more during a predetermined time period may be performed during an anti-lock brake system (ABS) or traction control system (TCS) control.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
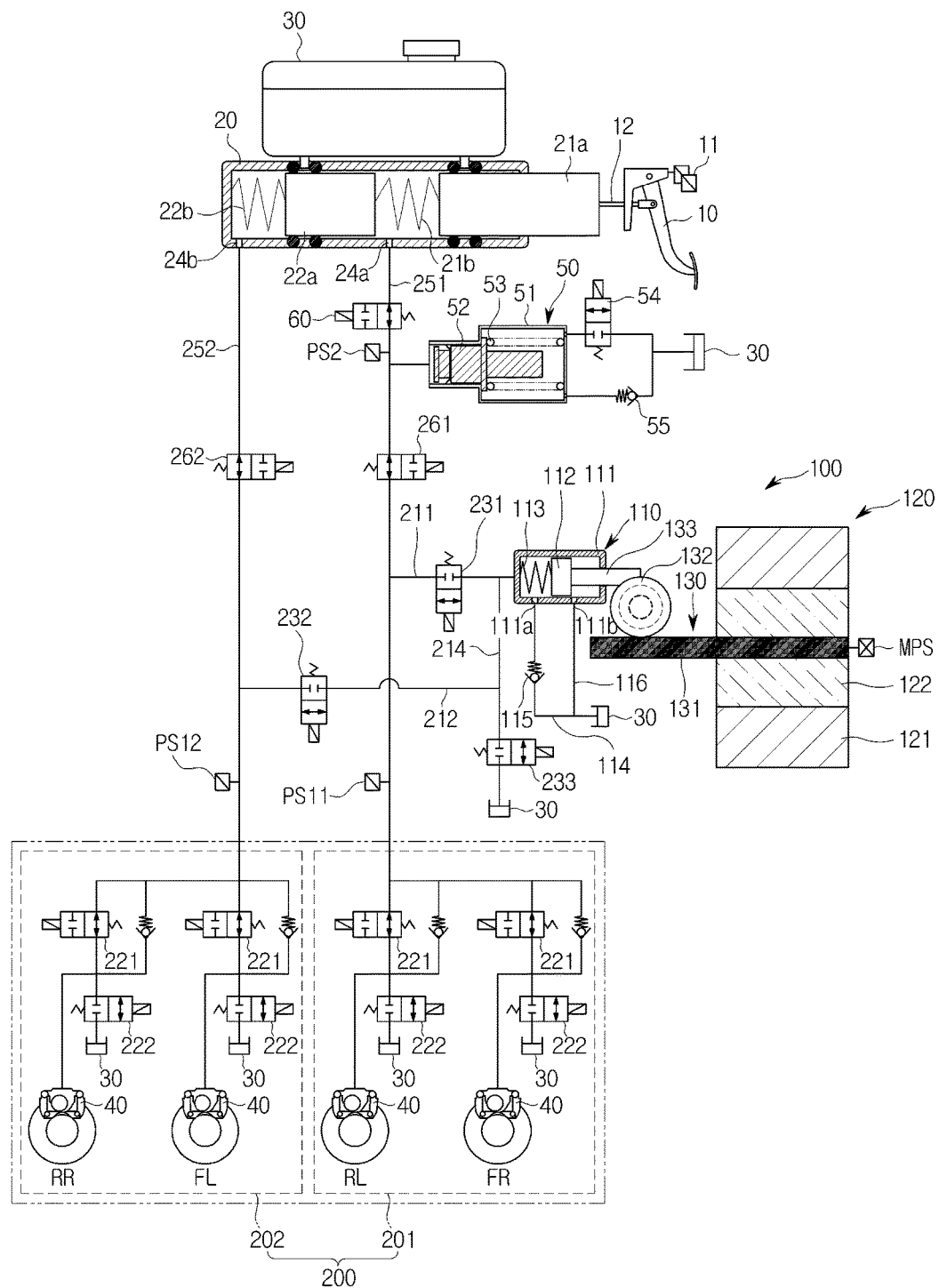
FIG. 1 is a hydraulic circuit diagram showing a non-braking state of an electronic brake system according to an embodiment of the present disclosure.

Hereinafter, embodiments of the present disclosure will be described in detail with reference to the accompanying drawings. The following embodiments are provided to fully convey the spirit of the disclosure to those skilled in the art. The present disclosure may, however, be embodied in different forms and should not be construed as limited to the embodiments set forth herein. In the drawings, some elements that need not be used to describe the present disclosure will be omitted for clarity, and some elements may be exaggerated to facilitate an understanding of the present disclosure.

FIG. 1 is a hydraulic circuit diagram showing a non-braking state of an electronic brake system 1 according to an embodiment of the present disclosure.

Referring to FIG. 1, typically, the electronic brake system 1 includes a master cylinder 20 configured to generate a hydraulic pressure, a reservoir 30 connected to an upper portion of the master cylinder 20 and configured to store oil, an input rod 12 configured to press the master cylinder 20 according to a pedal force of a brake pedal 10, a wheel cylinder 40 configured to receive the hydraulic pressure and brake wheels RR, RL, FR, and FL, a pedal displacement sensor 11 configured to detect a displacement of the brake pedal 10, and a simulation device 50 configured to provide a reaction force in response to the pedal force applied to the brake pedal 10.

The master cylinder 20 may have at least one chamber to generate a hydraulic pressure. As an example, the master cylinder 20 may have two chambers. A first piston 21a and a second piston 22a are provided in each chamber, and the first piston 21a may be connected to the input rod 12.

Meanwhile, the master cylinder 20 can ensure safety against failure because there are two chambers. For example, one of the two chambers may be connected to a front right wheel FR and a rear left wheel RL, and the other chamber may be connected to a front left wheel FL and a rear right wheel RR. Alternatively, one of the two chambers may be connected to the two front wheels FR and FL, and the other chamber may be connected to the two rear wheels RR and RL. By independently configuring two chambers as described above, it is possible to brake a vehicle even when one chamber fails.

To this end, first and second hydraulic ports 24a and 24b through which a hydraulic pressure is discharged from the two chambers may be formed in the master cylinder 20.

Also, a first spring 21b may be provided between the first piston 21a and the second piston 22a of the master cylinder 20, and a second spring 22b may be provided between the second piston 22a and an end of the master cylinder 20.

The fist spring 21b and the second spring 22b are provided in the two chambers. When the displacement of the brake pedal 10 changes, the first piston 21a and the second piston 22a are compressed, and thus elastic forces are stored in the first spring 21b and the second spring 22b. Also, when a force pushing the first piston 21a becomes smaller than the elastic force, the elastic forces stored in the first and second springs 21b and 22b push and return the first and second pistons 21a and 22a to original states thereof.

Meanwhile, the input rod 12 that presses the first piston 21a of the master cylinder 20 may be brought into close contact with the first piston 21a. That is, there may be no gap between the master cylinder 20 and the input rod 12. Accordingly, when the brake pedal 10 is depressed, the master cylinder 20 may be directly pressed without an inoperative portion of pedal stroke.

The simulation device 50 may be connected to a first backup flow path 251, which will be described below, to provide a reaction force in response to the pedal force applied to the brake pedal 10. Enough reaction force is provided to compensate for the pedal force, which is provided by a driver, so that the driver may finely control the braking force as intended.

Referring to FIG. 1, the simulation device 50 includes a pedal simulator having a simulation chamber 51 configured to store oil flowing out from the first hydraulic port 24*a* of the master cylinder 20, a reaction force piston 52 provided in the simulation chamber 51, a reaction force spring 53 configured to elastically support the reaction force piston 52, and a simulator valve 54 connected to a rear stage of the simulation chamber 51.

The reaction force piston 52 and the reaction force spring 53 may be installed to have a certain range of displacement in the simulation chamber 51 due to oil flowing into the simulation chamber 51.

The reaction force spring 53 shown in FIG. 1 is just an example of an element capable of providing an elastic force to the reaction force piston 52. However, the present disclosure may include various elements capable of storing an elastic force by shape deformation. As an example, the present disclosure includes various members capable of storing an elastic force by being formed of a material such as rubber or having a coil or plate shape.

The simulator valve 54 may be provided in a flow path that connects the rear stage of the simulation chamber 51 to a reservoir 30. A front stage of the simulation chamber 51 may be connected to the master cylinder 20, and the rear stage of the simulation chamber 51 may be connected to the reservoir 30 through the simulator valve 54. Accordingly, even when the reaction force piston 52 returns, oil of the reservoir 30 flows into the simulation chamber 51 through the simulator valve 54. Thus, the simulation chamber may be filled with the oil.

In FIG. 1, there are several reservoirs 30, which have the same numeral reference. However, the reservoirs may be formed using the same component or different components. As an example, the reservoir 30 connected to the simulation device 50 may be the same as the reservoir 30 connected to the master cylinder 20 or may be a separate storage capable of storing oil independently of the reservoir 30 connected to the master cylinder 20.

The simulator valve 54 may be configured as a normally closed solenoid valve, which normally remains closed. When a driver applies a pedal force to the brake pedal 10, the simulator valve 54 may be opened to deliver brake oil between the simulation chamber 51 and the reservoir 30.

Also, a simulator check valve 55 may be installed between the pedal simulator and the reservoir 30 in parallel with the simulator valve 54. The simulator check valve 55 may allow the oil of the reservoir 30 to flow to the simulation chamber 51 and may block the oil of the reservoir 30 from flowing to the reservoir 30 through a flow path in which the simulator check valve 55 is installed. When the pedal force is released from the brake pedal 10, the oil may be supplied into the simulation chamber 51 through the simulator check valve 55, and thus it is possible to ensure a quick return of the pressure of the pedal simulator.

The operation of the simulation device 50 will be described below. When a driver provides a pedal force to the brake pedal 10, the reaction force piston 52 of the pedal simulator compresses the reaction force spring 53, and the compression pushes oil out of the simulation chamber 51 and delivers the oil to the reservoir 30 through the simulator valve 54. In this process, the driver receives a pedal feeling. Also, when the driver release the pedal force from the brake pedal 10, the reaction force spring 53 pushes the reaction force piston 52, and thus the reaction force piston 52 returns to an original state thereof. In this case, the oil of the reservoir 30 flows into the simulation chamber 51 through a flow path in which the simulator valve 54 is installed and a flow path in which the check valve 55 is installed. As a result, the simulation chamber 51 may be filled with oil.

As described above, the simulation chamber 51 is always filled with oil, and thus a friction of the reaction force piston 52 is minimized when the simulation device 50 operates. Accordingly, it is possible to improve durability of the simulation device 50 and also preventing foreign substances from flowing in from the outside.

The electronic brake system 1 according to an embodiment of the present disclosure may include a hydraulic pressure supply device 100 configured to receive a driver's braking intent from the pedal displacement sensor 11 for detecting a displacement of the brake pedal 10 by means of an electric signal and to mechanically operate, a hydraulic pressure control unit 200 configured to control hydraulic pressure flow delivered to the wheel cylinder 40, hydraulic pressure control unit 200 having first and second hydraulic pressure circuits 201 and 202 provided in two wheels RL and FR and two wheels RR and FL, respectively, a first cut valve 261 provided in the first backup flow path 251 for connecting the first hydraulic port 24*a* and the first hydraulic circuit 201 and configured to control hydraulic pressure flow, a second cut valve 262 provided in the second backup flow path 252 for connecting the second hydraulic port 24*b* and the second hydraulic circuit 202 and configured to control hydraulic pressure flow, and an electronic control unit 2 (see FIG. 5) (herein also referred to as an ECU) configured to control the hydraulic pressure supply device 100 and the valves 54, 221, 222, 223, 224, 231, 232, 241, 242, 261, and 262 on the basis of hydraulic pressure information and pedal displacement information.

The hydraulic pressure supply device 100 includes a pressure provision unit 110 configured to provide an oil pressure delivered to the wheel cylinder 40, a motor 120 configured to generate a rotational force by using an electric signal of the pedal displacement sensor 11, and a power converter 130 configured to convert a rotational motion of the motor 120 into a linear motion and deliver the linear motion to the pressure provision unit 110.

The pressure provision unit 110 may include a pressure chamber 111 having a designated space capable of receiving and storing oil, a hydraulic piston 112 provided inside the pressure chamber 111, and a hydraulic spring 122 provided between the hydraulic piston 112 and the pressure chamber 111 and configured to elastically support the hydraulic piston 112.

The pressure chamber 111 may be connected to the reservoir 30 through an oil flow path 114 and configured to receive oil from the reservoir 30 and store the received oil. The oil flow path 114 may communicate with a first communication hole 111*a* formed at an entrance side of the pressure chamber 111. As an example, the first communication hole 111*a* may be formed at an entrance side of the pressure chamber 111 at which a pressure is generated when the hydraulic piston 112 advances.

Also, a check valve 115 for preventing the pressure of the pressure chamber 111 from flowing backward may be installed in the oil flow path 114. The check valve 115 is provided to block the oil of the pressure chamber 111 from flowing into the reservoir 30 through the oil flow path when the hydraulic piston 112 advances and to allow the oil of the reservoir 30 to be suctioned and then stored at the entrance side of the pressure chamber 111 when the hydraulic piston 112 returns.

Also, the hydraulic pressure supply device 100 may be configured to prevent the pressure in the pressure chamber 111 from not being released to atmospheric pressure while the hydraulic piston 112 returns and the hydraulic pressure in the pressure chamber 111 is absorbed. As an example, a second communication hole 111b is formed in the pressure chamber 111, and a connection flow path 116 for connecting the second communication hole 111b and the oil flow path 114 is formed between the oil flow path 114 and an exit side of the pressure chamber 111. In this case, the second communication hole 111b may be formed at a position corresponding to an initial position of the hydraulic piston 112 (i.e., the position of the hydraulic piston 112 in a case where the hydraulic piston 112 retreats to the exit side of the pressure chamber 111 and the pressure in the pressure chamber 111 is released). Accordingly, when the hydraulic piston 112 returns, the exit side of the pressure chamber 111 may be automatically connected to the reservoir 30 through the connection flow path 116 and thus the pressure may return to atmospheric pressure.

The motor 120 or 41 (see FIG. 5) is a device configured to generate a rotational force by using a signal output from the electronic control unit 2 (see FIG. 5) and may generate a rotational force in a forward direction or a reverse direction. A rotational angular velocity and a rotational angle of the motor 120 may be precisely controlled. The motor 120 is a well-known technique, and thus a detailed description thereof will be omitted.

The electronic control unit 2 controls a plurality of valves 31 (see FIG. 5) included in the electronic brake system 1 of the present disclosure, which will be described below, in addition to the motor 120 or 41 (see FIG. 5). An operation of controlling a plurality of valves according to a displacement of the brake pedal 10 will be described below.

A driving force of the motor 120 or 41 (see FIG. 5) generates a displacement of the hydraulic piston 112 through the power converter 130, and a hydraulic pressure generated while the hydraulic piston 112 slides in the pressure chamber 111 is delivered to the wheel cylinders 40 installed in the wheels RR, RL, FR, and FL through the first and second hydraulic flow paths 211 and 212.

The power converter 130 is a device configured to convert a rotational force into a linear motion. As an example, the power converter 130 may include a worm shaft 131, a worm wheel 132, and a driving shaft 133.

Figure 5:
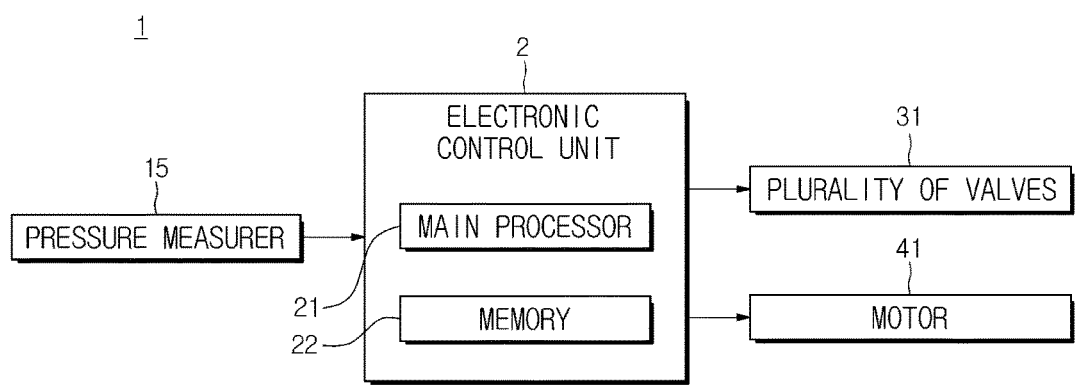
FIG. 5 is a schematic block diagram of an electronic brake system according to an embodiment of the present disclosure.

The worm shaft 131 may be formed as one body with a rotational shaft of the motor 120 or 41 (see FIG. 5). The worm shaft 131 has a worm formed on an outer circumferential surface of the worm shaft 131 to mesh with the worm wheel 132 and thus rotates the worm wheel 132. The worm wheel 132 meshes with the driving shaft 133 to linearly move the driving shaft 133, and the driving shaft 133 is connected to the piston 112 to slide the piston 112 in the pressure chamber 111.

In other words, with respect to the above operations, a signal detected by the pedal displacement sensor 11 when a displacement occurs in the brake pedal 10 is delivered to the electronic control unit 2 (see FIG. 5), and the electronic control unit 2 drives the motor 120 or 41 (see FIG. 5) in one direction to rotate the worm shaft 131 in one direction. The rotational force of the worm shaft 131 is delivered to the driving shaft 133 through the worm wheel 132, and then the hydraulic piston 112 connected to the driving shaft 133 moves, thus generating a hydraulic pressure in the pressure chamber 111.

On the contrary, when a pedal force is removed from the brake pedal 10, the electronic control unit 2 drives the motor 120 in an opposite direction to rotate the worm shaft 131 in an opposite direction. Accordingly, the worm wheel also rotates in an opposite direction, and thus the hydraulic piston 112 connected to the driving shaft 133 returns. In this case, it is possible to quickly suction the hydraulic pressure from the pressure chamber 111 by providing an elastic force to the hydraulic piston 112.

As described above, the hydraulic pressure supply device 100 delivers a hydraulic pressure to the wheel cylinder 40 or suctions a hydraulic pressure and delivers the suctioned hydraulic pressure to the reservoir 30 depending on a rotational direction of the rotational force generated by the motor 120.

Next, the hydraulic pressure control unit 200 according to an embodiment of the present disclosure will be described with reference to FIG. 1.

The hydraulic pressure control unit 200 may include a first hydraulic circuit 201 and a second hydraulic circuit 202, each of which receives a hydraulic pressure and controls two wheels. As an example, the first hydraulic circuit 201 may control a front right wheel FR and a rear left wheel RL, and the second hydraulic circuit 202 may control a front left wheel FL and a rear right wheel RR. Also, wheel cylinders 50 are installed in the wheels FR, FL, RR, and RL and configured to receive a hydraulic pressure to brake the wheels FR, FL, RR, and RL.

Also, the hydraulic pressure control unit 200 may receive a hydraulic pressure from the hydraulic pressure supply device 100 through a first hydraulic flow path 211 connecting the first hydraulic circuit 201 and the hydraulic pressure supply device 100 and a second hydraulic flow path connected to the second hydraulic circuit 202. In this case, the second hydraulic flow path 212 may be connected to a branch flow path 214 branched from the first hydraulic flow path 211.

Also, the first and second hydraulic flow paths 211 and 212 are connected to each other through the branch flow path 214 and configured to receive a hydraulic pressure from the hydraulic pressure supply device 100 and deliver the received hydraulic pressure to the wheel cylinders of the hydraulic circuits 201 and 202. In this case, the hydraulic circuits 201 and 202 may have a plurality of inlet valves to control flow of the hydraulic pressure.

As an example, the first hydraulic circuit 201 may have two inlet valves 221 connected to the first hydraulic flow path 211 and configured to control a hydraulic pressure delivered to two wheel cylinders 40. Also, the second hydraulic circuit 202 may have two inlet valves 221 connected to the second hydraulic flow path 212 and configured to control a hydraulic pressure delivered to wheel cylinders 40.

The inlet valves 221 are disposed at upstream sides of the wheel cylinders 40 and may be provided as a normally open solenoid valve, which operates such that the valve is normally open, but is closed when a closing signal is received from the electronic control unit 2.

Also, the hydraulic pressure control unit 200 may further include a plurality of outlet valves connected to the reservoir 30 in order to improve performance when the braking is released. The outlet valves 222 are connected to the wheel cylinders 40 and configured to control a hydraulic pressure to be released from the wheels RR, RL, FR, and FL. That is, the outlet valves 222 may detects a braking pressure of the wheels RR, RL, FR, and FL and may be selectively opened to control the wheels RR, RL, FR, and FL when decompression braking is needed.

Also, the outlet valves may be provided as a normally closed solenoid valve, which operates such that the valve is normally closed, but is opened when an opening signal is received from the electronic control unit 2.

Also, the electronic brake system 1 according to an embodiment of the present disclosure may further include a first switching valve 231 provided in the first hydraulic flow path 211 and a second switching valve 232 provided in the second hydraulic flow path 212.

The first and second switching valves 231 and 232 may be independently controlled and may be provided as a normally closed solenoid valve, which operates such that the valve is normally closed, but is opened when an opening signal is received. The first and second switching valves 231 and 232 are selectively opened or closed depending on a pressure required to control flow of the hydraulic pressure delivered to the wheel cylinders. For example, when a hydraulic pressure is provided only to the wheel cylinders 40 provided in the first hydraulic circuit 201, only the first switching valve 231 is opened so that a hydraulic pressure discharged through the hydraulic pressure supply device 100 may be delivered not to the second hydraulic circuit 202 but to the first hydraulic circuit 201. The operating mechanism of the first and second switching valves 231 and 232 will be described below again.

Also, the electronic brake system 1 according to an embodiment of the present disclosure may further include a release valve 233 configured to control a pressure so that the pressure follows a target pressure set according to the pedal force applied to the brake pedal 10 when the pressure is higher than the target pressure.

The release valve 233 may be provided in a flow path for connecting the reservoir 30 and the branch flow path 214 for connecting the two hydraulic circuits 201 and 202. That is, the release valve 233 may be provided between the hydraulic pressure supply device 100 and the first and second switching valves 231 and 232. The release valve 233 may be provided as a normally closed solenoid valve, which operates such that the valve is normally closed, but is opened when an opening signal is received from the electronic control unit 2.

The electronic brake system 1 according to an embodiment of the present disclosure may further include first and second backup flow paths 251 and 252 configured to directly supply oil discharged from the master cylinder 20 to the wheel cylinders when operating abnormally.

A first cut valve 261 configured to control flow of the oil may be provided in the first backup flow path 251, and a second cut valve 262 configured to control flow of the oil may be provided in the second backup flow path 252. Also, the first backup flow path 251 may connect the first hydraulic port 24a and the first hydraulic circuit 201, and the second backup flow path 252 may connect the second hydraulic port 24b and the second hydraulic circuit 202.

The first and second cut valves 261 and 262 may be provided as a normally open solenoid valve, which operates such that the valve is normally open, but is closed when a closing signal is received from the electronic control unit 2. The operating mechanism of the first and second cut valves 261 and 262 will be described below again.

Although not described, a reference numeral "PS11" indicates a first hydraulic flow path pressure sensor PS11 configured to detect a hydraulic pressure of the first hydraulic circuit 201, a reference numeral "PS12" indicates a second hydraulic flow path pressure sensor configured to detect a hydraulic pressure of the second hydraulic circuit 202, and a reference numeral "PS2" indicates a backup flow path pressure sensor configured to measure an oil pressure of the master cylinder 20. Also, a reference numeral "MPS" indicates a motor control sensor configured to control a rotational angle or electric current of the motor 120.

An operation of the electronic brake system 1 according to an embodiment of the present disclosure will be described below in detail.

Figure 2:
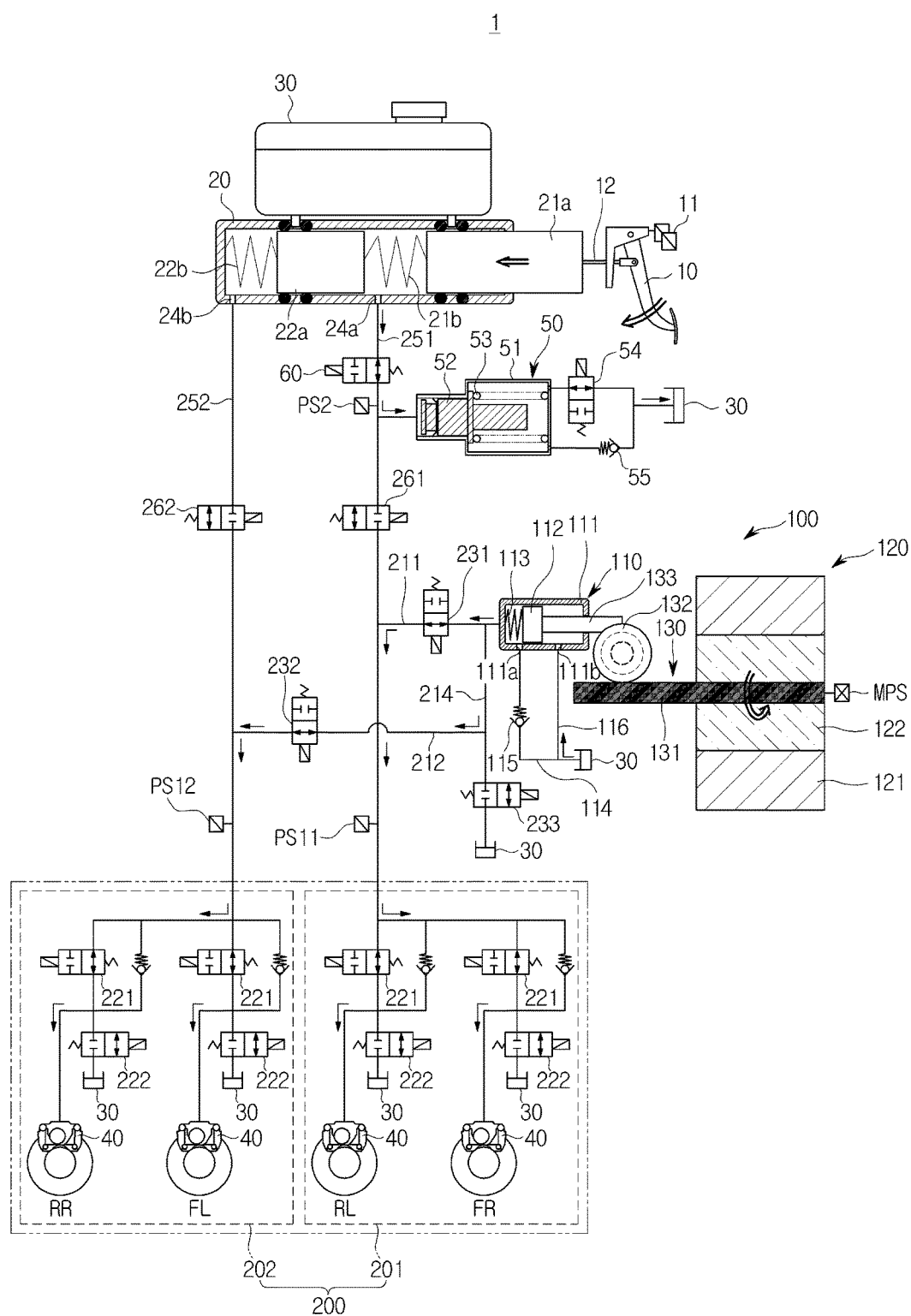
FIG. 2 is a hydraulic circuit diagram showing a normal braking state of an electronic brake system according to an embodiment of the present disclosure.

FIG. 2 is a hydraulic circuit diagram showing a normal braking state of an electronic brake system 1 according to an embodiment of the present disclosure.

Referring to FIG. 2, when braking is started by a driver, a braking amount required by the driver may be detected by the pedal displacement sensor 11 through information such as a pressure of the brake pedal 10 depressed by the driver. An electronic control unit 2 (see FIG. 5) receives an electric signal output from the pedal displacement sensor 11 and drives the motor 120.

Also, the electronic control unit 2 may receive a regenerative braking amount through the backup flow path pressure sensor PS2 provided at the exit side of the master cylinder 20 and the first and second hydraulic flow path pressure sensors PS11 and PS12 provided in the first and second hydraulic circuits 201 and 202 and calculate a frictional braking amount according to a difference between the required braking amount and the regenerative braking amount to find the magnitude of increase or decrease in pressure of the wheel cylinder 40.

In detail, when the driver depresses the brake pedal 10 at an initial braking state, the motor 120 operates. In this case, a rotational force of the motor 120 is delivered to the pressure provision unit 110 by the power converter 130, and a hydraulic pressure discharged from the pressure provision unit 110 is delivered to the first hydraulic flow path 211 and the second hydraulic flow path 212.

Meanwhile, when the hydraulic pressure is generated in the hydraulic pressure supply device 100, the first and second cut valves 261 and 262 installed in the first and second backup flow paths 251 and 252 connected to the first and second hydraulic ports 24a and 24b of the master cylinder 20 are closed so that the hydraulic pressure discharged from the master cylinder 20 is not delivered to the wheel cylinders 40.

Also, when the inlet valves 221 are opened, the hydraulic pressure discharged from the hydraulic pressure supply device 100 is delivered to the wheel cylinders 40 installed in the wheels RR, RL, FR, FL to generate a braking force. In this case, when the pressure delivered to the first and second hydraulic circuits 201 and 202 are measured as being higher than a target pressure corresponding to the pedal force applied to the brake pedal 10, the release valve 233 is opened to control the pressure so that the pressure may follow the target pressure.

A pressure generated by an increase in pressure of the master cylinder according to the pedal force applied to the brake pedal 10 is delivered to the simulation device 50 connected to the master cylinder 20. In this case, the normally closed simulator valve 54 disposed at a rear stage of the simulation chamber 51 is opened, and oil in the simulation chamber 51 is delivered to the reservoir 30 through the simulator valve 54. Also, as the reaction force piston 52 moves, a pressure corresponding to the weight of the reaction force spring 53 supporting the reaction force piston 52 is formed in the simulation chamber 51 to provide an appropriate braking feeling to the driver.

Figure 3:
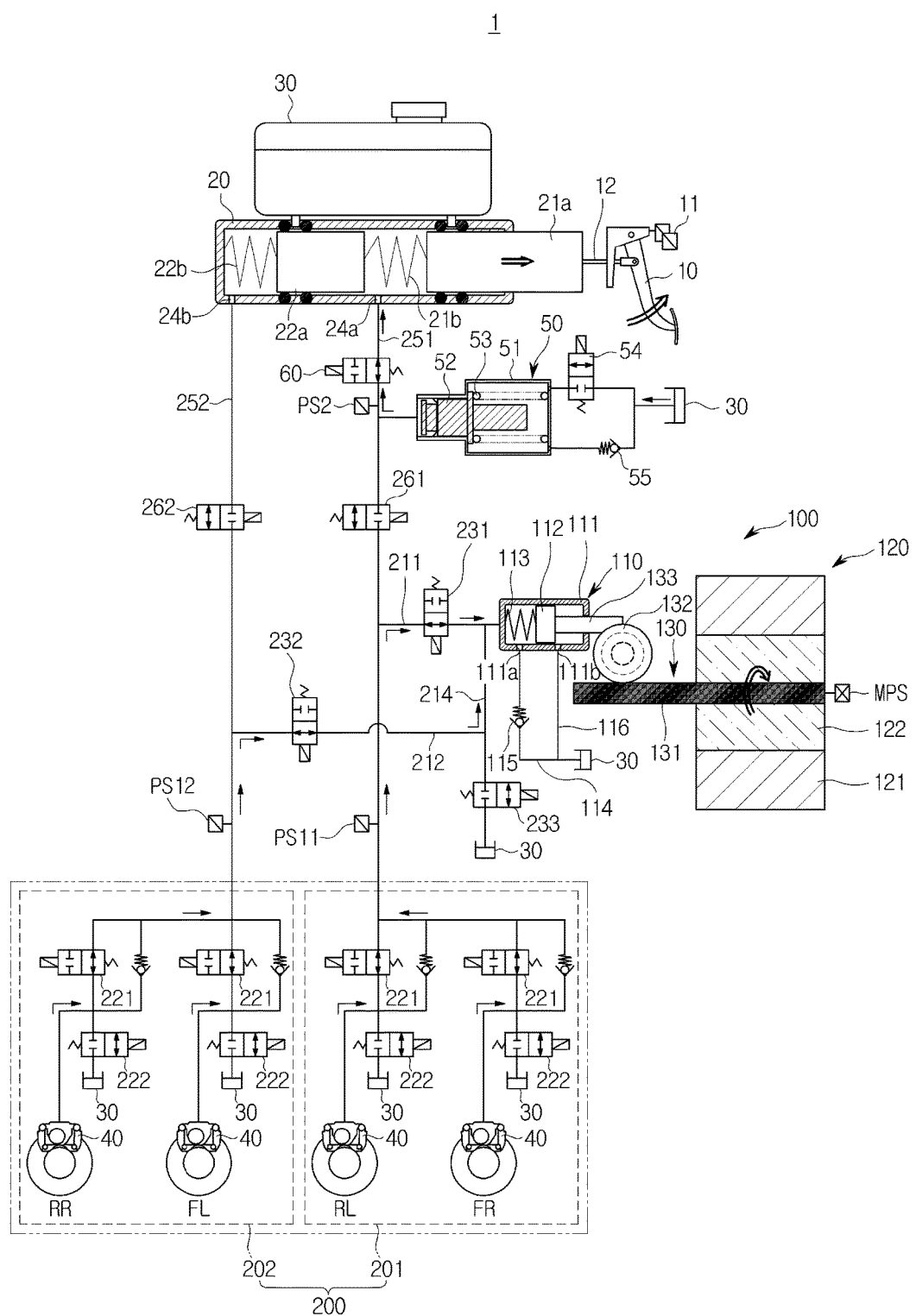
FIG. 3 is a hydraulic circuit diagram showing a normal braking-release state of an electronic brake system according to an embodiment of the present disclosure.

Next, a case in which a braking force is released during normal operation of the electronic brake system 1 according to an embodiment of the present invention will be described. FIG. 3 is a hydraulic circuit diagram showing a normal braking-release state of the electronic brake system 1 according to an embodiment of the present disclosure.

Referring to FIG. 3, when the pedal force is released from the brake pedal 10, the motor 120 generates a rotational force in a direction opposite to that during braking and delivers the generated rotational force to the power converter 130. The worm shaft 131, the worm wheel 132, and the driving shaft 133 of the power converter 130 rotate in directions opposite to those during braking in order to move the hydraulic piston 112 back to an original position thereof and thus release the pressure of the pressure provision unit 110. The pressure provision unit 110 receives a hydraulic pressure discharged from the wheel cylinders through the first and second hydraulic flow paths 211 and 212 and delivers the hydraulic pressure to the reservoir 30.

The inlet valves 221, the outlet valves 222, the first and second switching valves 231 and 232, the release valve 233, and the first and second cut valves 261 and 261 are controlled by the same opening/closing operation as that during braking. That is, the outlet valves 222, the release valve 233, and the first and second cut valves 261 and 262 are closed, and the inlet valves 221 and the first and second switching valves 231 and 232 are opened. Thus, the hydraulic pressure discharged from the wheel cylinders 40 of the first and second hydraulic circuits 201 and 202 are delivered into the pressure chambers 111 through the first and second hydraulic flow paths 211 and 212.

As the reaction force piston 52 returns to its original position by an elastic force of the reaction force spring 53, oil in the simulation chamber 51 is delivered to the master cylinder 20, and the simulation chamber 51 is refilled with oil through the simulator check valve and the simulator valve 54 connected to the reservoir 30. Thus, the simulation device 50 ensures a quick return of a pedal simulator pressure.

Also, when the hydraulic piston 112 is moved by the hydraulic pressure supply device 100, oil flow in the pressure chamber 111 may be controlled through the connection flow path 116 and the oil flow path 114 connected to the reservoir 30.

Also, the electronic brake system 1 according to an embodiment of the present disclosure may specify a control range by controlling the valves 221 and 222 provided in the hydraulic pressure control unit 200 according to a required pressure of the wheel cylinders 40 provided in the wheels RR, RL, FR, and FL of the two hydraulic circuits 201 and 202.

Figure 4:
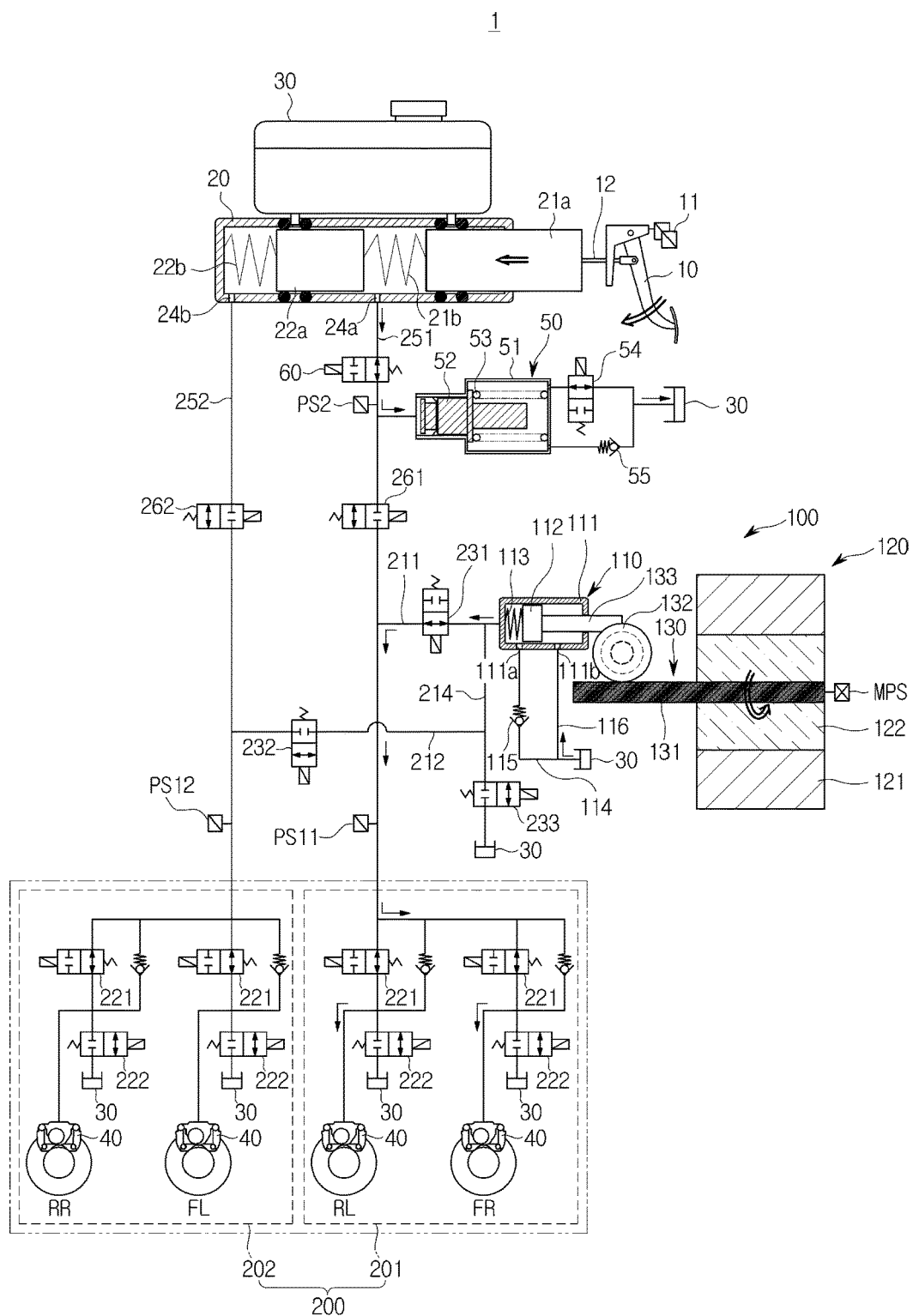
FIG. 4 is a hydraulic circuit diagram illustrating a state in which an ABS operates through an electronic brake system according to an embodiment of the present disclosure.

FIG. 4 is a hydraulic circuit diagram illustrating a state in which an ABS operates through the electronic brake system 1 according to an embodiment of the present disclosure.

FIG. 4 illustrates a case in which only a corresponding wheel cylinder performs a braking operation during an ABS operation, and shows a state in which only the wheels RL and RF of the first hydraulic circuit 201 are braked.

Referring to FIG. 4, the motor 120 operates according to the pedal pressure applied to the brake pedal 10, and a rotational force of the motor 120 is delivered to the pressure provision unit 110 through the power converter 130 to generate a hydraulic pressure. In this case, the first and second cut valves 261 and 262 are closed so that a hydraulic pressure discharged from the master cylinder 20 may not be delivered to the wheel cylinders 40.

Also, only the first switching valve 231 is opened and the second switching valve 232 is closed so that the hydraulic pressure discharged from the hydraulic pressure supply device 100 may not be delivered to the second hydraulic circuit 202. Also, the hydraulic pressure discharged from the hydraulic pressure supply device 100 is delivered only to the wheel cylinders 40 of the front right wheel FR and the rear left wheel RL provided in the first hydraulic circuit 201 through the first hydraulic flow path 211. Accordingly, the hydraulic pressure is delivered only to the wheels RL and FR of the first hydraulic circuit 201.

A structure for controlling the hydraulic pressure delivered to the wheel cylinders 40 through an opening or closing operation of the first and second switching valves 231 and 232 is just an embodiment. An embodiment of the present disclosure should be understood as including various control modules capable of increasing or decreasing the hydraulic pressure delivered to the wheels RL, RR, FL, and FR by independently opening or closing the inlet valves 221, the outlet valves 222, and the first and second switching valves 231 and 232.

That is, the electronic brake system 1 according to an embodiment of the present disclosure may selectively deliver or discharge the hydraulic pressure to the wheel cylinders of the wheels RL, RR, FL, and FR according to a required pressure by independently controlling operations of the motor 120 and the valves 54, 221, 222, 231, 232, 233, 261, and 262, thereby finely control the pressure.

Next, FIG. 5 is a schematic block diagram of the electronic brake system 1 according to an embodiment of the present disclosure.

In detail, referring to FIG. 5, an electronic brake system 1 of a vehicle includes a pressure measurer 15 configured to detect a hydraulic pressure in a hydraulic device, an electronic control unit 2 configured to perform a braking control operation, and a plurality of valves 31 and a motor 41 or 120 (see FIG. 1) located in a hydraulic circuit driving according to a control signal calculated by the electronic control unit 2.

The pressure measurer 15 includes a plurality of pressure sensors. In detail, as the pressure sensors included in the flow paths connected to the wheels FR, FL, RR, and RL, the reference numeral "PS11" shown in FIG. 1 corresponds to a first hydraulic flow path pressure sensor configured to detect a hydraulic pressure of the first hydraulic circuit 201, the reference numeral "PS12" shown in FIG. 1 corresponds to a second hydraulic flow path pressure sensor configured to detect a hydraulic pressure of the second hydraulic circuit 202, and the reference numeral "PS2" shown in FIG. 1 corresponds to backup flow path pressure sensors configured to measure an oil pressure of the master cylinder 20.

Accordingly, the pressure measured by the plurality of pressure sensors included in the pressure measurer 15 may be transmitted to the electronic control unit 2.

Also, although not shown, the electronic brake system 1 according to an embodiment of the present disclosure may include a pedal input unit (not shown) to transmit the measured pressure to the electronic control unit 2 through the pedal displacement sensor 11 shown in FIG. 1.

Next, the electronic control unit 2 collectively controls the electronic brake system 1 of the vehicle according to an embodiment of the present disclosure.

In detail, the electronic control unit 2 includes a main processor 21 configured to detect a driver's braking intent and a braking amount from the pedal input unit (not shown), calculate a braking pressure appropriate for a braking pressure required by the driver, and perform a valve control in order to solve a problem of increasing error between an estimated braking pressure and an actual braking pressure of each wheel due to an operation of repeatedly opening and closing valves located between the flow paths and the wheel cylinders, and a memory 22 configured to store various kinds of data.

Figure 6:
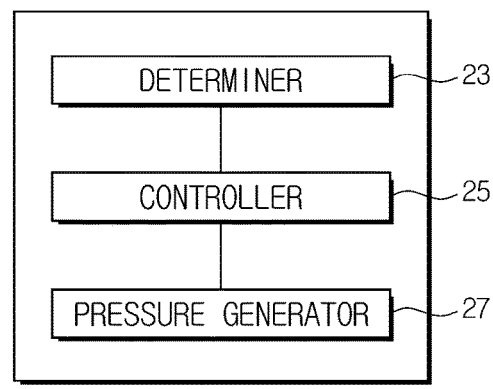
FIG. 6 is a schematic block diagram of a main processor in an electronic brake system according to an embodiment of the present disclosure.

FIG. 6 is a block diagram showing various software processing operations performed in the main processor 21. In detail, the main processor 21 includes a determiner 23 configured to determine whether an error between an estimated hydraulic pressure and an actual hydraulic pressure of a specific wheel cylinder is likely to increase due to repeated opening and closing of the valves, a controller 25 configured to control the valves in order to synchronize the hydraulic pressure of the specific wheel cylinder with a pressure in a hydraulic circuit when it is determined that the error is large, and a pressure generator 27 configured to reset the pressure of the hydraulic circuit.

Accordingly, the main processor 21 in the electronic control unit 2 may control operations of the plurality of valves 31 and the motor 41 included in the electronic brake system 1.

In detail, when it is necessary that the inlet valves 221 located between the wheel cylinders and the flow paths are repeatedly opened and closed like in an anti-lock brake system (ABS) or a traction control system (TCS), the determiner 23 in the main processor 21 determines whether an error between an estimated hydraulic pressure and an actual hydraulic pressure of a specific wheel cylinder is likely to increase.

In order to perform the determination, the determiner 23 may determine that an error between an estimated hydraulic pressure and an actual hydraulic pressure in the corresponding wheel cylinder is likely to increase when the inlet valves 221 are opened or closed a predetermined number (a critical number) of times or more during a predetermined time period (a critical time period).

Next, when the determiner 23 determines that the inlet valve 221 connected to the specific wheel cylinder is opened or closed a predetermined number of times or more during a predetermined time period, the controller 25 in the main processor 21 controls the inlet valves 221 in particular among the plurality of valves 31.

In detail, in order to synchronize a hydraulic pressure of a wheel cylinder in which an error has occurred, the controller 25 opens an inlet valve 221 connected to the corresponding wheel cylinder and closes the remaining inlet valves 221 connected to the wheel cylinders other than the corresponding wheel cylinder.

For example, when the inlet valve 221 connected to the wheel cylinder included in the right rear wheel RR is detected as being opened or closed a predetermined number of times or more during a predetermined time period, the controller 25 opens the inlet valve 221 of the rear right wheel RR and closes the inlet valves 221 of the remaining wheels FL, RL, and FR.

Thus, the flow path to the right rear wheel RR is fully opened, and thus an environment in which the pressure in the hydraulic circuit can be in equilibrium with the wheel cylinder may be provided.

Next, the pressure generator 27 makes a request for a circuit pressure for resetting the hydraulic pressure of the flow path connected to the corresponding wheel cylinder.

For example, after the flow path to the right rear wheel is fully opened to form an environment in which the pressure in the hydraulic circuit can be in equilibrium with the pressure in the wheel cylinder, the pressure generator 27 makes a request to make the pressure in the corresponding flow path be equal to the pressure in the wheel cylinder (synchronization).

Subsequently, the main processor 21 determines that the synchronization has ended when a pressure measured by a pressure sensor installed in the flow path becomes equal to an estimated pressure of the wheel cylinder and finishes the synchronization task for the estimated braking pressure and the actual braking pressure.

Next, the memory 22 in the electronic control unit 2 may include volatile memories such as a static RAM (SRAM) and a dynamic RAM (DRAM) and also non-volatile memories such as a flash memory, a read-only memory (ROM), an erasable programmable ROM (EPROM), and an electrically erasable programmable ROM (EEPROM).

A non-volatile memory can semi-permanently store a control program and control data for controlling operation of the electronic brake system 1, and a volatile memory can load a control program and control data from a non-volatile memory, temporarily store the control program and control data, and temporarily store various control signals output from various kinds of sensor information and the main processor.

The configuration of the electronic brake system 1 according to an embodiment of the present disclosure has been described above.

Figure 7:
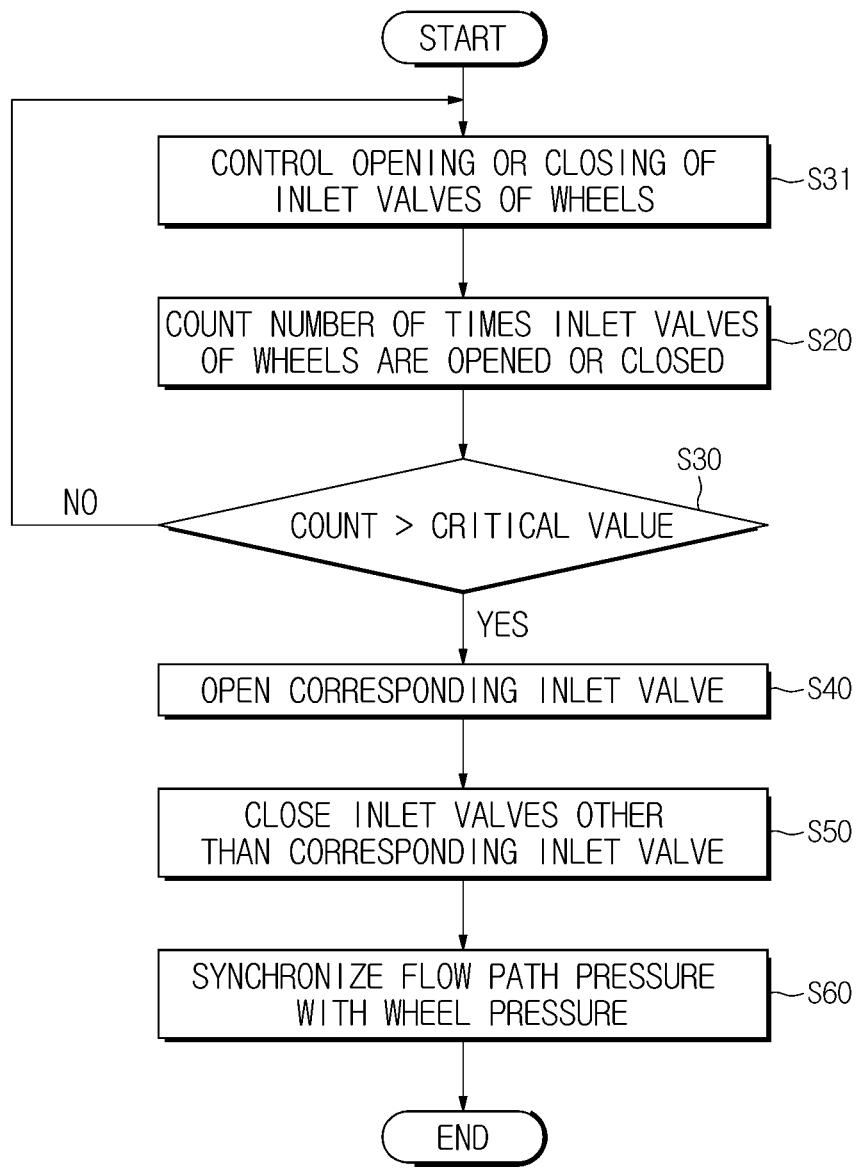
FIG. 7 is a flowchart of a control method of another electronic brake system according to an embodiment of the present disclosure.

FIG. 7 is a flowchart of a control method of the electronic brake system 1 according to an embodiment of the present disclosure.

First, as shown in FIG. 7, the electronic brake system 1 according to an embodiment of the present disclosure controls the opening or closing of inlet valves 221 included in wheels in consideration of a driver's braking intent and a braking situation (S31).

In detail, the main processor 21 detects the driver's braking intent and a braking amount from the pedal input unit (not shown), calculates a braking pressure appropriate for a braking pressure required by the driver, and controls the inlet valves in order to solve a problem of increasing error between an estimated braking pressure and an actual braking pressure of each wheel due to an operation of repeatedly opening and closing valves located between the flow paths and the wheel cylinders.

Subsequently, when it is necessary that the inlet valves 221 located between the wheel cylinders and the flow paths are repeatedly opened and closed like in an anti-lock brake system (ABS) or a traction control system (TCS), the electronic brake system 1 counts the number of times the inlet valves 221 included in the wheels are opened or closed in order to determine whether an error between an estimated hydraulic pressure and an actual hydraulic pressure of a specific wheel cylinder is likely to increase (S20).

When a result of the count of the electronic control unit 2 is that the inlet valves included in the wheels are opened or closed a predetermined number of times (a critical number of times) or more during a predetermined time (a critical time period) (S30), the electronic brake system 1 determines whether an error between an estimated hydraulic pressure and an actual hydraulic pressure of a specific wheel cylinder is likely to increase and opens a corresponding inlet valve connected to the wheel cylinder (S40) and closes the remaining inlet valves other than the corresponding inlet valve (S50).

Accordingly, the flow path is fully opened to provide an environment in which the pressure in the hydraulic circuit can be in equilibrium with the pressure of the wheel cylinder. The electronic brake system 1 performs control so that the pressure of the flow path may become equal to the pressure of the wheel cylinder (synchronization) (S60).

Subsequently, although not shown, the main processor 21 makes a request to make the pressure of the flow path be equal to the pressure of the wheel cylinder, determines that the synchronization has ended when a pressure measured by a pressure sensor installed in the flow path becomes equal to the estimated pressure of the wheel cylinder, and finishes the synchronization task for the estimated braking pressure and the actual braking pressure according to the present disclosure.

As is apparent from the above description, it is possible to solve the problem of increasing error between an estimated braking pressure and an actual braking pressure caused by repeatedly opening and closing valves located at wheels during a braking control of ABS, TCS, or the like.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An electronic brake system comprising:
    at least one or more valves provided to control a hydraulic pressure each delivered to wheel cylinders provided in wheels;
    a pressure measurer configured to measure the hydraulic pressure delivered to the wheel cylinders provided in the wheels; and
    a controller configured to
        count a number of times for opening and closure of first one or more valves connected to a first wheel cylinder to detect whether the number of times for opening and closure of the first one or more valves reach at a predetermined number of times during a predetermined time period, and
        synchronize the measured hydraulic pressure with a hydraulic pressure of the first wheel cylinders, when the number of times for opening and closure of the first one or more valves are detected to reach at the predetermined number of times during the predetermined time period, by
            opening the first one or more valves that deliver the hydraulic pressure to the first wheel cylinder among the wheel cylinders, and
            closing other one or more valves that deliver the hydraulic pressure to remaining wheel cylinders other than the first wheel cylinder.

2. The electronic brake system of claim 1, further comprising:
    a master cylinder configured to discharge oil in response to a pedal force applied to a brake pedal;
    a reservoir connected to the master cylinder and configured to store the oil;
    a pedal displacement sensor configured to detect a displacement of the brake pedal;
    a hydraulic pressure supply device configured to generate a hydraulic pressure by using a rotational force of a motor operated by an electric signal output from the pedal displacement sensor; and
    a hydraulic pressure control unit configured to deliver the hydraulic pressure discharged from the hydraulic pressure supply device to the wheel cylinders provided in the wheels,
    wherein the controller controls the motor and the valves on the basis of hydraulic pressure information and displacement information of the brake pedal.

3. The electronic brake system of claim 2, wherein the controller restarts to control the motor and the valves on the basis of the hydraulic pressure information and the displacement information of the brake pedal after synchronizing the hydraulic pressure of the first wheel cylinder.

4. The electronic brake system of claim 3, wherein the controller detects that the first one or more valves are opened or closed, a number of times of which reach at a predetermined number of times or more during a predetermined time period during an anti-lock brake system (ABS) or traction control system (TCS) control.

5. A control method of an electronic brake system, the control method comprising:
    controlling a hydraulic pressure each delivered to wheel cylinders provided in wheels by opening or closing at least one or more valves;
    measuring the hydraulic pressure each delivered to the wheel cylinders provided in the wheels;
    counting a number of times for opening and closure of first one or more valves connected to a first wheel cylinder;
    determining whether the number of times for opening and closure of the first one or more valves are detected to reach at a predetermined number of times during a predetermined time period; and
    synchronizing the measured hydraulic pressure with a hydraulic pressure of the first wheel cylinders, when the number of times for opening and closure of the first one or more valves are detected to reach at the predetermined number of times during the predetermined time period, by
        opening the first one or more valves that deliver the hydraulic pressure to the first wheel cylinder among the wheel cylinders, and
        closing other one or more valves that deliver the hydraulic pressure to remaining wheel cylinders other than the first wheel cylinder.

6. The control method of claim 5, the control method further comprises:
    discharging, by a master cylinder, oil in response to a pedal force applied to a brake pedal;
    detecting, by a pedal displacement sensor, a displacement of the brake pedal;
    generating, by a hydraulic pressure supply device, a hydraulic pressure by using a rotational force of a motor operated by an electric signal output from the pedal displacement sensor; and
    delivering the hydraulic pressure discharged from the hydraulic pressure supply device to the wheel cylinders provided in the wheel,
    wherein a reservoir is connected to the master cylinder and stores the discharged oil.

7. The control method of claim 6, further comprising restarting control of the motor and the valves on the basis of hydraulic pressure information and displacement information of the brake pedal after synchronizing the hydraulic pressure of the first wheel cylinder.

8. The control method of claim 7, wherein the determination of whether the number of times for opening and closure of the first one or more valves are detected to reach at the predetermined number of times during the predetermined time period is performed during an anti-lock brake system (ABS) or traction control system (TCS) control.

* * * * *